April 30, 1940.   S. B. HASELTINE   2,198,700
FRICTION SHOCK ABSORBING MECHANISM
Filed Sept. 14, 1937   3 Sheets-Sheet 1
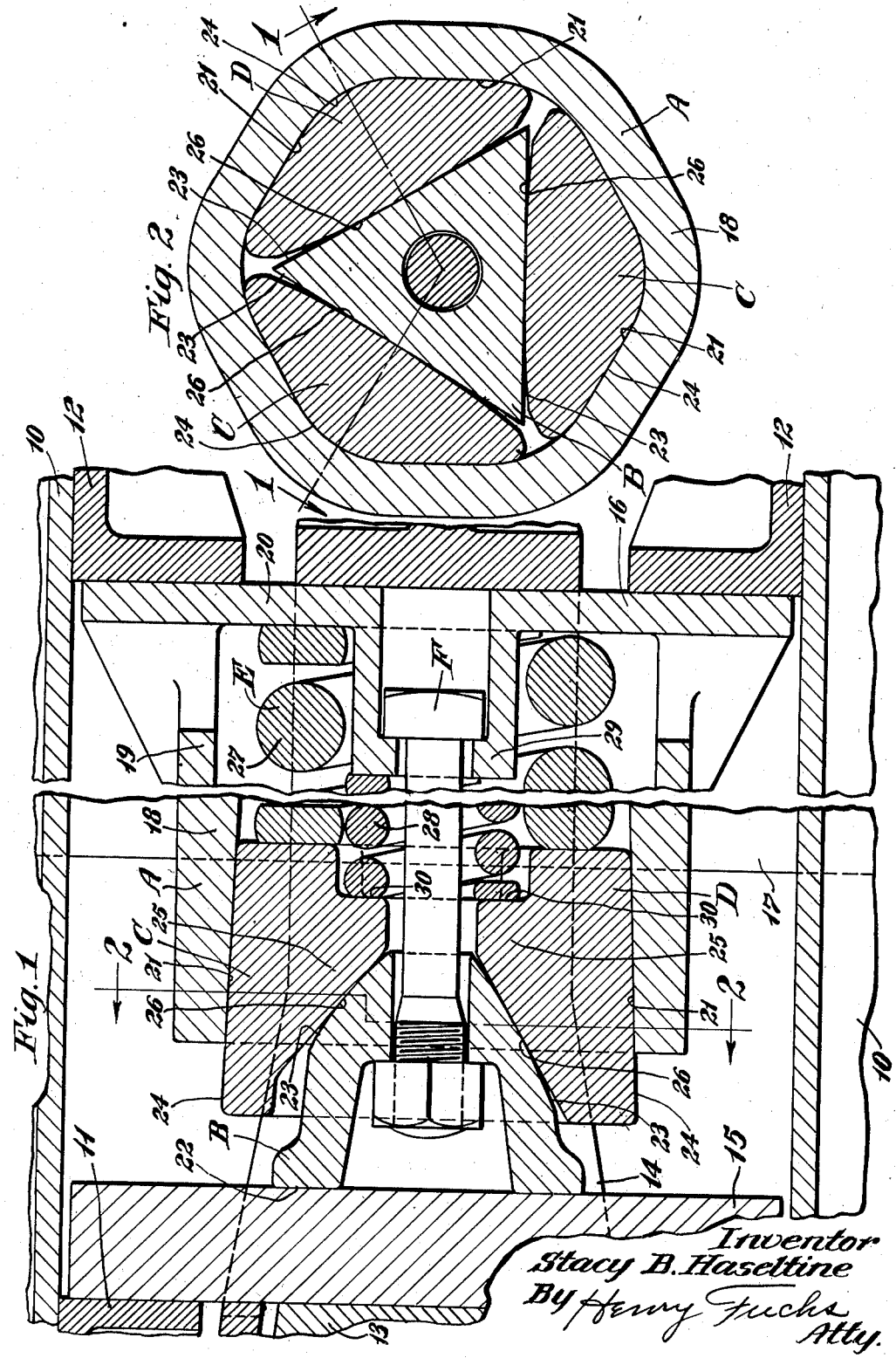
Inventor
Stacy B. Haseltine
By Henry Fuchs
Atty.

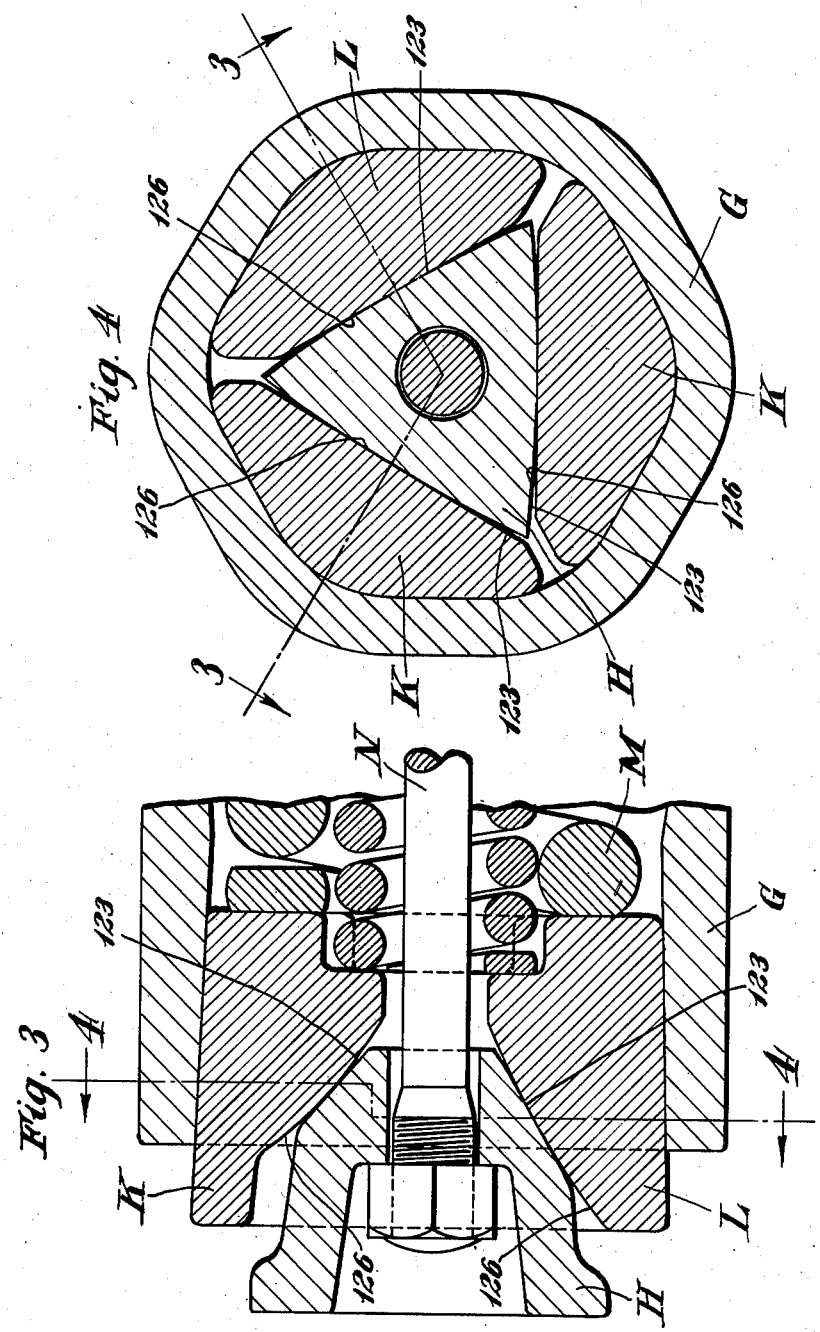

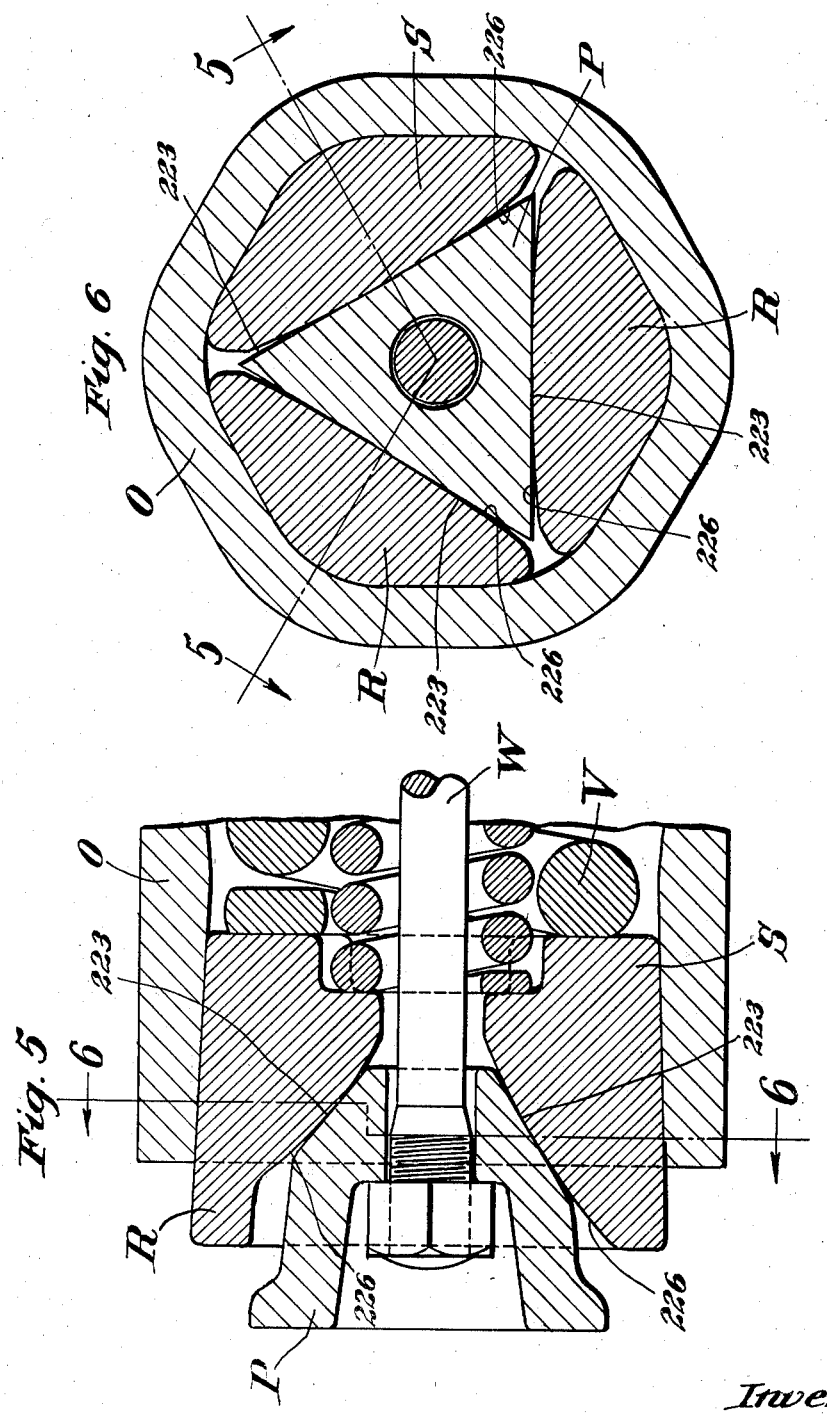

Patented Apr. 30, 1940

2,198,700

UNITED STATES PATENT OFFICE 2,198,700

FRICTION SHOCK ABSORBING MECHANISM

Stacy B. Haseltine, Glen Ellyn, Ill., assignor to W. H. Miner, Inc., Chicago, Ill., a corporation of Delaware Application September 14, 1937, Serial No. 163,769

17 Claims. (Cl. 213—32)

This invention relates to improvements in friction shock absorbing mechanisms for railway draft riggings, and more particularly to such mechanisms wherein are employed a wedge friction system including wedge means and a plurality of friction shoes coacting with a friction casing.

As is well known to those skilled in the art, in order to obtain the required high capacity together with efficient and reliable operation of friction shock absorbing mechanisms for railway draft riggings demanded by modern railway practice, it is important that the cooperating elements of the friction wedge system be accurately fitted to each other when operating in service, in other words, that they have true contact with each other on relatively large surface areas.

To effect such accurate fitting of the parts by the usual manufacturing procedures is impractical because the labor and expense involved is prohibitive.

The friction casings, which are in the form of castings, are subject to certain slight inaccuracies due to unavoidable foundry variations, affecting trueness of the friction shell sections thereof, and the trueing up of the friction surfaces of the shell by procedures commonly employed by skilled mechanics is prohibitive in cost due to the time and labor involved in such trueing up operations. These inaccuracies occur due to the necessary foundry variations which must be permitted in commercial practice in the manufacture of the friction casings and thus there is a lack of uniformity in the casings produced.

It has for some time been the practice in this art, in order to produce an efficient mechanism, to compensate for these inaccuracies in casings by fitting the other parts of the gear to each individual casing by crowning one of the faces of each cooperating set of engaging wedge faces of the pressure transmitting member and shoes to permit adjustment between these parts when the mechanism is initially assembled, and then flattening down said crowned faces by successive compressions of the mechanism.

One object of the invention is to provide a shock absorbing mechanism including friction shoes and wedge means forming a friction clutch cooperating with a friction casing, wherein the opposed engaged faces or surfaces of the wedge means and shoes are so formed that universal adjustment is provided between said parts within the limits of variations necessitated by commercial manufacture of the casings to positively insure immediate proper contact of all of the cooperating engaging sets of friction surfaces of the shoes and casing of the mechanism, and true contact between said wedge faces of the shoes and wedge means after a few actuations of said mechanism.

A more specific object of the invention is to provide a type of friction shock absorbing mechanism comprising a friction casing having interior friction surfaces extending lengthwise of the casing, a plurality of friction shoes slidable on said surfaces, and a centrally disposed wedge block having wedge faces engaging the shoes, wherein the engaging faces of the wedge and shoes are initially crowned in such a manner as to provide universal adjustment between these parts to compensate for slight variations in transverse alignment of the cooperating friction surfaces of the shoes and casing, as well as variations in the longitudinal inclination of the friction surfaces thereof, and wherein said engaging wedge faces are adapted to be flattened out under pressure to produce substantially true flat surface contact between these faces, thereby compensating for unavoidable variations which may occur in the casing contour due to permissible foundry variations occurring in commercial practice.

Still another object of the invention is to provide a process or method by which the contacting faces of the pressure transmitting wedge and shoes of the mechanism of the character indicated will be brought into true flat surface engagement with each other after a very few actuations after the parts have been assembled, whereby permitted foundry variations in transverse contour and inclination of the friction surfaces of the casing containing the wedge and shoes will be automatically compensated for.

Other objects of the invention will more clearly appear from the description and claims hereinafter following.

In the drawings forming a part of this specification, Figure 1 is a broken longitudinal sectional view of a portion of a railway draft rigging illustrating my improvements in connection therewith, the section through the shell or casing and friction elements therewithin corresponding to two section planes at 120° apart, as indicated by the line 1—1 in Figure 2. Figure 2 is a transverse sectional view corresponding substantially to the line 2—2 of Figure 1. Figure 3 is a view similar to Figure 1, illustrating another embodiment of the invention, and showing the front end portion of the friction shock absorbing mechanism, the cooperating parts of the railway draft rigging being omitted in this view, the section being on the line 3—3 of Figure 4. Figure 4 is a transverse vertical sectional view, corresponding substantially to the line 4—4 of Figure 3. Figure 5 is a view similar to Figure 3, illustrating still another embodiment of the invention, said view being taken on the sectional line 5—5 of Figure 6. Figure 6 is a transverse vertical sectional view, corresponding substantially to the line 6—6 of Figure 5.

In said drawings, 10—10 denote the usual draft or center sills of a car underframe structure, said sills being preferably of channel cross section and to the inner faces of which are secured the usual front and rear stop lugs 11—11 and 12—12. The inner end portion of the drawbar is indicated at 13, the same being operatively connected to a hooded yoke 14 of well-known form and within which is disposed the shock absorbing mechanism proper hereinafter described and a front follower 15.

The improved friction shock absorbing mechanism proper illustrated in the drawing is of that type employing a substantially hexagonal casing having a rear follower 16 formed integral therewith. The casing is supported within the yoke and the yoke, in turn, is supported by a detachable saddle plate 17 fixed to the draft sills.

Referring first to the embodiment of the invention illustrated in Figures 1 and 2, the improved shock absorbing mechanism proper, as shown, comprises a casing A; a pressure transmitting wedge B having longitudinally crowned wedge faces; three friction shoes C—C and D having transversely crowned wedge faces; a spring resistance E; and a retainer bolt F.

The casing A is of substantially hexagonal exterior cross section having the friction shell portion proper 18 thereof formed at the open front end thereof. Rearwardly of the friction shell section, the casing A provides a spring cage portion 19. The casing is closed at the rear end by a transverse vertical wall 20 which extends laterally outwardly at opposite sides of the casing, thus providing flanges which form the spring follower section 16 cooperating with the rear stop lugs 12—12 in the manner of the usual rear follower. As shown clearly in Figures 1 and 2, the walls of the friction shell portion 18 of the casing are relatively thickened with respect to the rear sections of said wall. The friction shell section 18 of the casing is of hexagonal interior cross section and presents three interior friction surfaces 21—21—21 which are of V-shaped cross section, extend lengthwise of the casing, present substantially flat faces, and converge inwardly and rearwardly toward the central longitudinal axis of said casing. As will be evident, the converged friction surfaces 21—21—21 provide a friction shell portion which is tapered slightly toward the rear of the mechanism.

The wedge B through which the pressure is transmitted, is in the form of a hollow block having a front transverse bearing face 22 engaging the front follower 15. At its rear end, the wedge B is provided with three rearwardly converging, longitudinally convex or crowned wedge faces 23—23—23 disposed around the center or axis of the wedge and giving the wedge the appearance of a truncated triangular pyramid.

The three friction shoes C—C and D are preferably in the form of drop-forgings and are of like construction, except as hereinafter pointed out, each having an outer V-shaped friction surface 24, the sections of which are in flat face engagement with the corresponding sections of the cooperating V-shaped friction surface 21 of the casing A and correspondingly inclined thereto. On the inner side, that is, the side nearest the axis of the casing A, each shoe is provided with a lateral enlargement 25 on the front side of which is provided a rearwardly and inwardly inclined, transversely convex or crowned face 26 cooperating with one of the inclined faces 23 of the wedge block B. As shown clearly respectively in Figures 1 and 2, the faces 23 of the wedge B and 26 of the shoes C—C and D are only slightly crowned or convex, being curved on an arc of relatively great radius, for a purpose hereinafter described.

In the present disclosure, my improvements are shown as embodied in a friction shock absorbing mechanism of the blunt and keen angle type, that is, of the character illustrated in O'Connor Patent No. 1,497,935, June 17, 1924, wherein the wedge has true or keen wedging engagement with one shoe and blunt wedging engagement with the remaining two shoes. However, my invention is not limited to a mechanism of this type and is equally well adapted to mechanisms wherein the angles of wedging engagement between the wedge and the friction shoes are all equal, that is, wherein the wedge has wedging engagement at the same angle with each shoe. As shown in the drawings, the shoes C and C have blunt wedging engagement with the wedge B, and the shoe D has keen angle wedging engagement with said wedge.

The spring resistance E, as shown, comprises an outer heavy coil 27 bearing at its inner end against the wall 20 of the casing A and an inner relatively lighter coil 28 bearing at its inner end on a hollow cuplike boss 29 formed integral with the end wall 20. At its forward end, the outer coil 27 of the spring bears directly on the inner ends of the shoes C—C and D. The inner coil 28 of the spring extends forwardly beyond the coil 27 and bears on the transverse shoulders 30—30—30 formed by the enlargements 25—25—25 of the shoes C—C and D.

The retainer bolt F is anchored at its rear end within the boss 29 and at its forward end within a suitable recess provided within the wedge B, the latter being apertured to accommodate the shank of the bolt. The bolt F not only serves to maintain the parts assembled but is also utilized to adjust the parts to proper overall length to maintain them in this position when under full release, and to place the spring under initial compression to compensate for wear.

In connection with my improved shock absorbing mechanism, assuming a compression action due to either a buffing or draft action of the drawbar, the general operation of the mechanism is as follows, detailed consideration of the cooperating convex or crowned inclined faces being omitted at this time: As the wedge B is forced inwardly of the casing, the shoes C—C and D will be forced rearwardly therewith against the resistance of the spring E and spread apart due to the wedging action between the cooperating wedge faces of the wedge B and the shoes, thereby forcing the shoes into intimate frictional contact with the friction surfaces of the casing A. High frictional resistance is thus produced between the casing A and the shoes C—C and D as they are forced inwardly of the latter, thereby effecting cushioning of the shocks to which the mechanism is subjected. Due to the inward taper of the friction shell section 18 of the casing A, a differential action will be set up between the shoes C—C and D and the wedge B, during compression of the mechanism, the shoes being advanced inwardly of the casing at a greater rate than the wedge, thereby augmenting the resistance to shocks offered by the mechanism.

Upon reduction of the actuating or compression force, the expansive action of the spring E effects release of the parts by forcing the shoes C—C and D and wedge B outwardly until further outward movement of the wedge is limited by the bolt F. The three shoes will be forced outwardly to their normal position limited by the wedge B as clearly shown in Figure 1.

Referring now more specifically to the operation of the convexed or crowned surfaces of the pressure transmitting wedge B and the shoes C—C and D: In commercial practice a variation of two degrees in the taper of the casing friction surfaces in a device of the kind disclosed is permitted. In carrying out my invention, the radius of curvature of each convex face 23 is made relatively long and of such a length that it will accommodate variations within the two degrees hereinbefore referred to, that is, assuming the maximum variation in one direction, contact will be insured between the curved surface 23 and the surface 26 near the inner ends thereof; assuming the limit of variation in the opposite direction, contact will be assured between the curved surface 23 and the surface 26 near their outer ends; a casing formed with the friction surfaces tapered accurately as designed will insure contact at the center of the curved surface 23 and the surface 26; and variations intermediate the points referred to will insure contact between the extreme limits mentioned.

The curvature of the transversely convex or crowned surface 26 of each shoe is such that it will accommodate variations in the hexagonal contour of the casing, that is, that the shoe will fit the corresponding V-shaped friction surfaces of the casing when the casing is slightly distorted and the surface displaced with respect to what its position would be in a truly hexagonal casing as designed having all its sides equal. Any inequality which results from the V-shaped friction surfaces of the casing being askew is compensated for by transverse rocking of the curved face 26 of the shoe on the cooperating wedge face 23 of the wedge block B. The curvature of the face 26 is preferably made relatively slight to facilitate rapid flattening of the same under pressure and still give the maximum limit of adjustment required.

When the parts are assembled, there will be, theoretically only, a point contact between each set of surfaces 23 and 26, but as soon as the device is compressed once this theoretical point contact will immediately be widened into a surface contact of appreciable area, and as two or three or four additional compressions of the mechanism occur, the area of contact is correspondingly increased until a sufficiently large enough area is obtained to insure the proper functioning of the device.

This process of fitting the parts to compensate for permissible foundry variations can obviously be accomplished in the usual test of the gear before being shipped and applied to the car.

Referring next to the embodiment of the invention illustrated in Figures 3 and 4, the structure comprises a substantially hexagonal friction casing G; a wedge block H; three friction shoes K—K and L; a spring resistance M; and a retainer bolt N.

The friction casing G, spring resistance M, and retainer bolt N are identical with the casing A, spring resistance E, and retainer bolt F, hereinbefore described in connection with Figures 1 and 2, and the wedge H and the friction shoes K—K and L are similar to the wedge B and the shoes C—C and D, hereinbefore described, with the exception that the cooperating wedge faces of the wedge H and the shoes K—K and L are of a different character. The wedge faces of the wedge block H, which are indicated by 123—123—123, are slightly crowned or convexed transversely, and the wedge faces of the shoes, which are indicated by 126—126—126, are crowned or curved longitudinally of the mechanism. These cooperating faces 123 and 126 are thus substantially the reverse of the faces 23 and 26 of the construction illustrated in Figures 1 and 2, but together operate in a similar manner, the longitudinally curved face 126 of the shoe compensating for irregularities in the taper of the casing, and the transversely curved face 123 of the wedge compensating for irregularity in the hexagonal contour of the casing.

Referring next to the embodiment of the invention illustrated in Figures 5 and 6, the structure comprises a substantially hexagonal casing O; a wedge block P having substantially flat wedge faces; friction shoes R—R and S, each having a wedge face which is crowned or curved both longitudinally and transversely; a spring resistance V; and a retainer bolt W.

The friction casing O, spring resistance V, and retainer bolt W are identical with the casing A, spring resistance E, and retainer bolt F, hereinbefore described in connection with Figures 1 and 2, and the wedge P and friction shoes R—R and S are similar to the wedge B and shoes C—C and D, thereinbefore described, with the exception that the wedge faces of the wedge block P, which are indicated by 223, are perfectly flat and the wedge faces of the shoes R—R and S, which are indicated by 226—226—226, are curved both longitudinally and transversely. The shoe faces 226—226—226 thus provide for adjustment both for variations in inclination of the friction surfaces of the casing and variations in the hexagonal contour of said casing. In other words, the faces 226—226—226 being of ball-shaped contour provide for universal adjustment of the shoes with respect to the wedge block.

In operation, the constructions illustrated in Figures 3 and 4 and 5 and 6 function in substantially the same manner as the device illustrated in Figures 1 and 2, the crowned wedge faces being flattened out after a few compressions of the mechanism to produce true flat surface contact between the wedge and shoes.

From the foregoing it will be observed that my improvements permit of automatic compensation of the parts even though the variation in inclination of one friction surface 21 may differ from the variation found in any other friction surface 21 and though the casing may be distorted from true regular hexagonal shape in cross section. It will also be evident that no increase in cost of manufacture of any of the parts as compared with a device of similar type is involved, and the parts will automatically adjust themselves and produce the desired results hereinbefore indicated.

I have herein shown and described what I now consider the preferred manner of carrying out my invention, but the same is merely illustrative and I contemplate all changes and modifications that come within the scope of the claims appended hereto.

I claim:

1. In a friction shock absorbing mechanism, the combination with a friction casing having interior, transversely disposed longitudinally extending friction surfaces surrounding the longitudinal central axis of the casing and forming a friction shell section of said casing; of a spring resistance; a friction shoe cooperable with one of the friction surfaces of said casing and slidable thereon lengthwise of the casing, said shoe having on its inner side a transversely disposed, longitudinally extending face inclined inwardly toward the center of the casing; and a member through which the actuating pressure is transmitted to said shoe and having a corresponding contacting face, one of said faces being curved in transverse direction, the curvature of said face being relatively slight, whereby when the parts are initially assembled contact of relatively minute area is had between said faces to compensate for variations, within predetermined limits, in cross-sectional, interior contour of said friction shell section, said curved face being flattened automatically upon actuations of the mechanism to thereby increase the area of contact of said surfaces and produce true contact therebetween.

2. In a friction shock absorbing mechanism, the combination with a friction casing having interior, longitudinally extending friction surfaces; of a spring resistance; friction shoes cooperable with said surfaces; and a wedge block through which the pressure is transmitted to said shoes, said wedge block and shoes having cooperating sets of engaging wedge faces, one face of each set being curved both transversely and longitudinally, said transverse and longitudinal curvatures being relatively small, whereby when the parts are initially assembled contact of relatively minute area is had between said faces to compensate for variations within predetermined limits, said curved faces being flattened out automatically upon actuations of the mechanism to thereby increase the area of contact of said faces and produce true contact therebetween.

3. In a friction shock absorbing mechanism, the combination with a friction casing having interior, longitudinally extending friction surfaces; of a spring resistance; friction shoes cooperable with said surfaces; and a wedge block through which the pressure is transmitted to said shoes, said wedge block and shoes having cooperating sets of engaging wedge faces, one face of each set being curved transversely and the other face of said set being curved longitudinally, the transverse and longitudinal curvatures of said faces being relatively small, whereby when the parts are initially assembled contact of relatively minute area is had between said faces to compensate for variations within predetermined limits, said curved faces being flattened out automatically upon actuations of the mechanism to thereby increase the area of contact of said faces and produce true contact therebetween.

4. In a friction shock absorbing mechanism, the combination with a friction casing having interior, longitudinally extending, inwardly converging friction surfaces of V-shaped cross section; of a spring resistance; friction shoes having V-shaped surfaces cooperable with said casing surfaces; and a wedge block through which the pressure is transmitted to said shoes, said wedge block and shoes having cooperating sets of engaging wedge faces, one of said faces of each set being curved in a direction transversely of the casing, the curvature of said face being relatively slight, whereby when the parts are initially assembled contact of relatively minute area is had between said faces to compensate for variations, within predetermined limits, in the angularity in the friction surfaces of the casing, said curved faces being flattened out automatically upon actuations of the mechanism to thereby increase the area of contact of said faces and produce true contact therebetween.

5. In a friction shock absorbing mechanism, the combination with a friction casing of substantially hexagonal cross section having interior, longitudinally extending, inwardly converging friction surfaces of V-shaped cross section; of a spring resistance; friction shoes having V-shaped friction surfaces cooperable with said casing surfaces; and a wedge block through which the pressure is transmitted to said shoes, said wedge block and shoes having cooperating sets of engaging wedge faces, one face of each set being curved both transversely and longitudinally, said transverse and longitudinal curvatures being relatively small, whereby when the parts are initially assembled contact of relatively minute area is had between said faces to compensate for variations within predetermined limits, said curved faces being flattened out automatically upon actuations of the mechanism to thereby increase the area of contact of said faces and produce true contact therebetween.

6. In a friction shock absorbing mechanism, the combination with a friction casing of hexagonal shape having interior, longitudinally extending, inwardly converging friction surfaces of V-shaped cross section; of a spring resistance; friction shoes having V-shaped friction surfaces cooperating with said casing surfaces; and a wedge block through which the pressure is transmitted to said shoes, said wedge block and shoes having cooperating sets of engaging wedge faces, one face of each set being curved transversely and the other face of said set being curved longitudinally, the transverse and longitudinal curvatures of said faces being relatively small, whereby when the parts are initially assembled contact of relatively minute area is had between said faces to compensate for variations within predetermined limits, said curved faces being flattened out automatically upon actuations of the mechanism to thereby increase the area of contact of said faces and produce true contact therebetween.

7. In a friction shock absorbing mechanism, the combination with a friction casing having interior, longitudinally extending friction surfaces surrounding the longitudinal central axis of the casing and forming the friction shell section of said casing; of a spring resistance; friction shoes in engagement with said friction surfaces; and a wedge block, said wedge block and shoes having cooperating sets of wedge faces inclined inwardly toward the longitudinal axis of the mechanism, the shoe wedge face of each set being curved in a direction transversely of the casing to provide for adjustment to compensate for variations in cross-sectional, interior contour of said shell section.

8. In a friction shock absorbing mechanism, the combination with a friction casing having interior, longitudinally extending friction surfaces surrounding the longitudinal central axis of the casing and forming the friction shell section of said casing; of a spring resistance; friction shoes in frictional engagement with the casing friction surfaces; and a wedge block, said block and shoes having cooperating sets of wedge faces inclined inwardly toward the longitudinal axis of the mechanism, the faces of said wedge being curved in directions transversely of the casing to provide for adjustment to compensate for variations in cross-sectional, interior contour of said shell section.

9. In a friction shock absorbing mechanism, the combination with a friction casing having interior, longitudinally extending friction surfaces; of a spring resistance; friction shoes having sliding frictional engagement with the casing surfaces, and each shoe having a wedge face on the inner side thereof inclined inwardly toward the longitudinal central axis of the mechanism, said wedge face being curved both longitudinally and transversely; and a wedge block having wedge faces in wedging engagement with the wedge faces of said shoes.

10. In a friction shock absorbing mechanism, the combination with a friction casing having interior, longitudinally extending friction surfaces; of a spring resistance; friction shoes in sliding engagement with said friction surfaces; and a wedge block, said wedge block and shoes having cooperating sets of wedge faces inclined inwardly toward the longitudinal axis of the mechanism, the shoe wedge face of each set being curved transversely, and the cooperating wedge face of the block being curved longitudinally.

11. In a friction shock absorbing mechanism, the combination with a friction casing having interior, longitudinally extending friction surfaces in sliding engagement with the casing friction surfaces; of a wedge block, said wedge block and shoes having cooperating sets of wedge faces inclined inwardly toward the longitudinal axis of the mechanism, the shoe wedge face of each set being curved longitudinally and the cooperating wedge face of the block being curved transversely.

12. In a friction shock absorbing mechanism, the combination with a column element having longitudinally extending friction surfaces surrounding the longitudinal axis of said column element; of a spring resistance; friction shoes cooperable with said column element friction surfaces; and a member through which the actuating pressure is transmitted to said shoes, said member and shoes having cooperating sets of wedge faces, one of the faces of each set being curved transversely of the mechanism to provide for adjustment to compensate for variations in cross-sectional outline of the column at said friction surfaces.

13. The herein described process of insuring proper fitting of the parts of a friction mechanism which includes a member having slightly converging friction surfaces, friction shoe elements cooperable therewith and an element through which the actuating pressure is transmitted to the shoes, which includes: manufacturing said member and all of said elements and providing on one of said elements an engaging surface slightly elevated at its transverse center with respect to portions on opposite sides thereof in a direction transverse of the mechanism to allow for relative adjustment between said contacting elements in transverse direction to compensate for variations in transverse positioning of the friction surfaces of said member; assembling said member and elements with the remaining parts of the mechanism and with said elevated portion in contact with the other element; and then compressing the mechanism a number of times, thereby compressing said elements and effecting relative movement thereof to flatten out said elevated portions to provide a wider area of contact with the cooperating element.

14. The herein described process of insuring the accurate fitting of the parts of a friction shock absorbing mechanism comprising a friction casing having interior, inwardly converging friction surfaces; a spring resistance; a plurality of friction shoes cooperable with said surfaces, and a pressure transmitting wedge having contact with said shoes on cooperating sets of wedge faces, which includes: manufacturing said casing, spring resistance, shoes and wedge and initially providing one of each of the contacting sets of wedge faces of the shoes and wedge with a transverse crown and the other face of each set with a longitudinal crown, said crowned faces being of relatively small curvature; assembling the parts; and then successively compressing the mechanism to effect relative movement of said shoes and wedge to flatten down said crowned surfaces to provide enlarged flat contacting areas between said shoes and wedge.

15. The herein described process of insuring the accurate fitting of the parts of a friction shock absorbing mechanism, including the following steps: forming a friction casing having interior friction surfaces; forming friction shoe elements adapted to cooperate therewith and providing each shoe with a crowned wedge face curved both longitudinally and transversely; forming a wedge element having wedge faces adapted to engage the crowned faces of the shoes; assembling said wedge element and shoe elements with the remaining parts of the mechanism and with the crowned portion in contact with the wedge element; and then compressing the mechanism a number of times to flatten out said crowned portion to provide wider area of contact with the wedge element.

16. In a friction shock absorbing mechanism, the combination with a friction casing having interior, longitudinally extending friction surfaces; of a spring resistance; a friction shoe cooperable with one of the friction surfaces of said casing, said shoe having on its inner side a face inclined inwardly toward the center of said casing; and a member through which the actuating pressure is transmitted to said shoe and having a corresponding contacting face having a portion thereof in engagement with said shoe face, said contacting faces of said shoe and member diverging slightly from each other in both lateral and longitudinal directions from the locality of engagement between said faces, to provide for relative rocking movement to compensate for variations within predetermined limits in cross-sectional and longitudinal contour of the friction casing, said point of contact of said faces being flattened automatically upon actuations of the mechanism to thereby increase the area of contact to produce true surface engagement therebetween.

17. In a friction shock absorbing mechanism, the combination with a friction casing having interior, longitudinally extending, inwardly converging friction surfaces; of a spring resistance;

friction shoes having friction surfaces engaging said casing surfaces; and a wedge block through which the pressure is transmitted to said shoes, said wedge block and shoes having cooperating sets of engaging wedge faces, the faces of each set having contact with each other at one common point and diverging slightly from each other in both longitudinal and lateral directions from said point of contact, to provide for relative rocking adjustment between said wedge and shoes to compensate for variations within predetermined limits in cross-sectional and longitudinal interior contour of the friction casing, said point of contact being flattened automatically upon actuations of the mechanism to thereby increase the area of contact and provide true surface engagement between the surfaces of each set.

STACY B. HASELTINE.